(12) United States Patent
Hopkins et al.

(10) Patent No.: US 10,296,476 B2
(45) Date of Patent: May 21, 2019

(54) PROFILING TRANSACTIONS ON AN INTEGRATED CIRCUIT CHIP

(71) Applicant: UltraSoC Technologies Limited, Cambridge (GB)

(72) Inventors: Andrew Brian Thomas Hopkins, Folkestone (GB); Michael Jonathan Thyer, Cambridge (GB); Iain Craig Robertson, Cople (GB)

(73) Assignee: UltraSoC Technologies Limited, Cambridge (GB)

( * ) Notice: Subject to any disclaimer, the term of this patent is extended or adjusted under 35 U.S.C. 154(b) by 238 days.

(21) Appl. No.: 15/235,647

(22) Filed: Aug. 12, 2016

(65) Prior Publication Data

US 2017/0046288 A1 Feb. 16, 2017

(30) Foreign Application Priority Data

Aug. 12, 2015 (GB) .................................. 1514344.9

(51) Int. Cl.
*G06F 13/36* (2006.01)
*G06F 13/40* (2006.01)

(52) U.S. Cl.
CPC .......... *G06F 13/36* (2013.01); *G06F 13/4068* (2013.01)

(58) Field of Classification Search
None
See application file for complete search history.

(56) References Cited

U.S. PATENT DOCUMENTS

| 8,185,724 B2* | 5/2012 | Ford | G06F 11/364 712/227 |
| 2008/0040634 A1* | 2/2008 | Matsuzaki | G06F 11/3466 714/47.2 |
| 2008/0222382 A1* | 9/2008 | Snyder | G06F 11/3466 711/200 |
| 2012/0054375 A1* | 3/2012 | Arndt | G06F 11/3485 710/18 |
| 2012/0226839 A1* | 9/2012 | Fuoco | G06F 11/3636 710/110 |
| 2012/0331034 A1 | 12/2012 | Fawaz et al. | |
| 2013/0268741 A1 | 10/2013 | Daly et al. | |
| 2014/0177633 A1* | 6/2014 | Manula | H04L 43/028 370/392 |

FOREIGN PATENT DOCUMENTS

EP 1847931 10/2007

OTHER PUBLICATIONS

UK Search Report; Application No. GB1514344.9; dated Mar. 29, 2016; 4 pages.

* cited by examiner

*Primary Examiner* — Elias Mamo
(74) *Attorney, Agent, or Firm* — Fish & Richardson P.C.

(57) ABSTRACT

A method of profiling transactions on an integrated circuit chip. The method comprises, for each transaction: extracting the transaction from interconnect circuitry of the integrated circuit chip; and filtering the transaction at a filtering circuit to determine which passband a parameter of the transaction lies within; sending an increment signal to a counter of a bank of counters, the counter having a counter value indicative of a number of transactions having the parameter lying within the passband; and outputting the counter values of the bank of counters.

20 Claims, 3 Drawing Sheets

PROFILING TRANSACTIONS ON AN INTEGRATED CIRCUIT CHIP

BACKGROUND

This disclosure relates to profiling transactions on an integrated circuit chip.

In the past, an embedded system which had multiple core devices (processors, memories etc.) would have been incorporated onto a Printed Circuit Board (PCB) and connected on the PCB via buses. Traffic in the embedded system was conveyed over these buses. This arrangement was convenient for debugging the core devices, because debugging tools such as oscilloscopes and logic analyzers could be attached to the PCB's buses allowing direct access to the core devices.

Market demand for smaller products coupled with advances in semiconductor technology has led to the development of System-on-Chip (SoC) devices. In a SoC, the multiple core devices of an embedded system are integrated onto a single chip. In a SoC, the traffic in the embedded system is conveyed over internal buses, thus connection of debugging tools directly to the system bus is no longer possible. The resulting reduced access coupled with an increasing quantity of data being transported around the chip (due to developments of SoC technology leading to integration of multiple processing cores and higher internal clocking frequencies), has reduced the ability of external debugging tools to find and solve bugs within the system in the timescales demanded by the industry.

Thus, the development of SoC devices required associated development in debugging technology, which lead to the integration of some debug functionality onto the SoC. It is now customary for on-chip debugging circuitry to monitor transactions on the internal buses of the SoC under the control of an off-chip debugger.

As well as detecting bugs, debug functionality may additionally be utilised to profile memory usage on the SoC. Specifically, it can monitor activity of the code being implemented. The data collected is sent to the off-chip debugger, where that data is analysed. As a result of this analysis, the debugger may reconfigure the on-chip memory functionality so as to optimise memory usage on-chip. Profiling can be done by instrumenting the code. This method is precise but intrusive and may change the timing of the program being profiled. Alternatively, profiling can be done by periodic sampling. This is less intrusive but less precise because the inter-sample behaviour is not captured.

SUMMARY OF THE INVENTION

According to a first aspect of this disclosure, there is provided a method of profiling transactions on an integrated circuit chip, the method comprising, for each transaction: extracting the transaction from interconnect circuitry of the integrated circuit chip; filtering the transaction at a filtering circuit to determine which passband a parameter of the transaction lies within; sending an increment signal to a counter of a bank of counters, the counter having a counter value indicative of a number of transactions having the parameter lying within the passband; and outputting the counter values of the bank of counters.

Suitably, in response to receiving the increment signal at the counter, the method comprises incrementing the counter value.

If the counter value is the maximum counter value of the counter then, at the counter, in response to receiving the increment signal, the method comprises retaining the counter value as the maximum counter value.

In response to a counter of the bank of counters reaching its maximum counter value, the method may generate a saturation signal.

The method may comprise outputting the saturation signal to a debug controller.

Suitably, the counter values are output in response to a saturation signal caused by a counter of the bank of counters reaching its maximum counter value.

The counter values may be output after a time interval T since the counter values were last output.

The counter values may be output in response to an event occurring on the integrated circuit chip.

If the transaction does not have a parameter within a passband of the filtering circuit, the method comprises discarding the transaction without incrementing a counter of the bank of counters.

Suitably, the counter bank comprises N counter bits, and the method further comprises receiving a configuration from a debug controller allocating a number of counter bits to each counter.

The filtering circuit may comprise a bank of filters, and the filtering circuit may receive a configuration from the debug controller for each filter of the bank of filters.

Suitably, the method comprises applying a first configuration to a first filter for monitoring a first parameter of the transaction, and applying a second configuration to a second filter for monitoring a second parameter of the transaction, wherein the second parameter is different to the first parameter.

The method may comprise applying a third configuration to a third filter for monitoring a third parameter of the transaction, and applying a fourth configuration to a fourth filter for monitoring the third parameter of the transaction, wherein the fourth configuration causes the fourth filter to have a different passband for the third parameter than the third filter.

Suitably, each filter of the bank of filters is connected to a respective counter of the bank of counters, wherein only if a parameter value of a transaction lies in the passband of a filter for that parameter is an increment signal sent to the respective counter.

The method may further comprise: masking the parameter value of the transaction to form a masked parameter value prior to filtering the transaction at the filtering circuit; filtering the transaction at the filtering circuit by, at each filter, comparing the masked parameter value to the passband of the filter; and for each filter, if the masked parameter value matches the passband of the filter, sending an increment signal to the respective counter.

The method may further comprise pre-filtering the transaction at a pre-filtering circuit to determine whether the transaction has a desired transaction type, and only if the transaction has the desired transaction type filtering the transaction at the filtering circuit.

Suitably, the parameter is an address.

The configuration for each filter may specify a starting address and a step size.

Suitably, the parameter is one of a burst length, a transaction identifier, and a response.

According to a second aspect of this disclosure, there is provided an integrated circuit chip comprising: system circuitry comprising interconnect circuitry for transporting transactions; and debugging circuitry comprising a filtering circuit and a bank of counters, the debugging circuitry being configured to: extract a transaction from the interconnect circuitry; filter the transaction at the filtering circuit to determine which passband a parameter of the transaction lies within; send an increment signal to a counter of a bank of counters, the counter having a counter value indicative of a number of transactions having the parameter lying within the passband; and output the counter values of the bank of counters.

The interconnect circuitry may be a bus.
The interconnect circuitry may be a memory interface.

BRIEF DESCRIPTION OF THE DRAWINGS

The present disclosure will now be described by way of example with reference to the accompanying drawings. In the drawings.

DETAILED DESCRIPTION

The following disclosure describes a debug architecture suitable for implementation on a SoC or an MCM.

Figure 1:
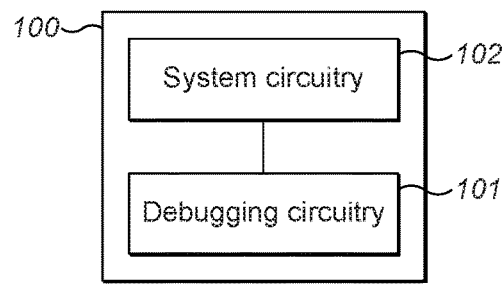
FIG. 1 is a schematic drawing of an exemplary debug architecture on an integrated circuit chip device.
Figure 2:
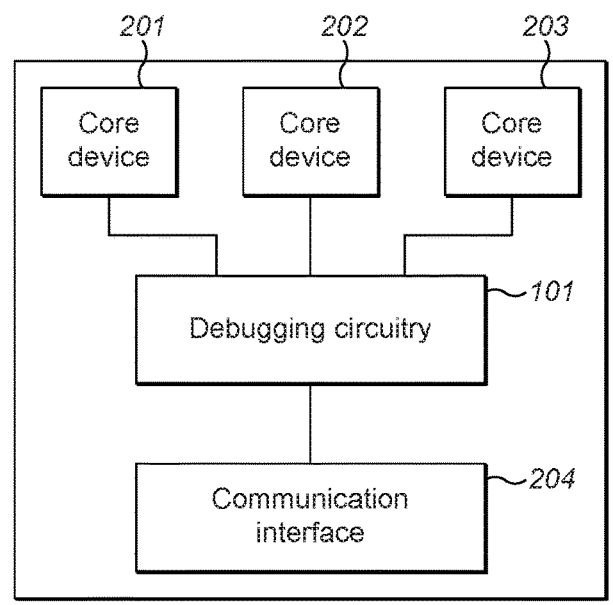
FIG. 2 is a schematic drawing of an exemplary debug architecture on an integrated circuit chip device.
Figure 3:
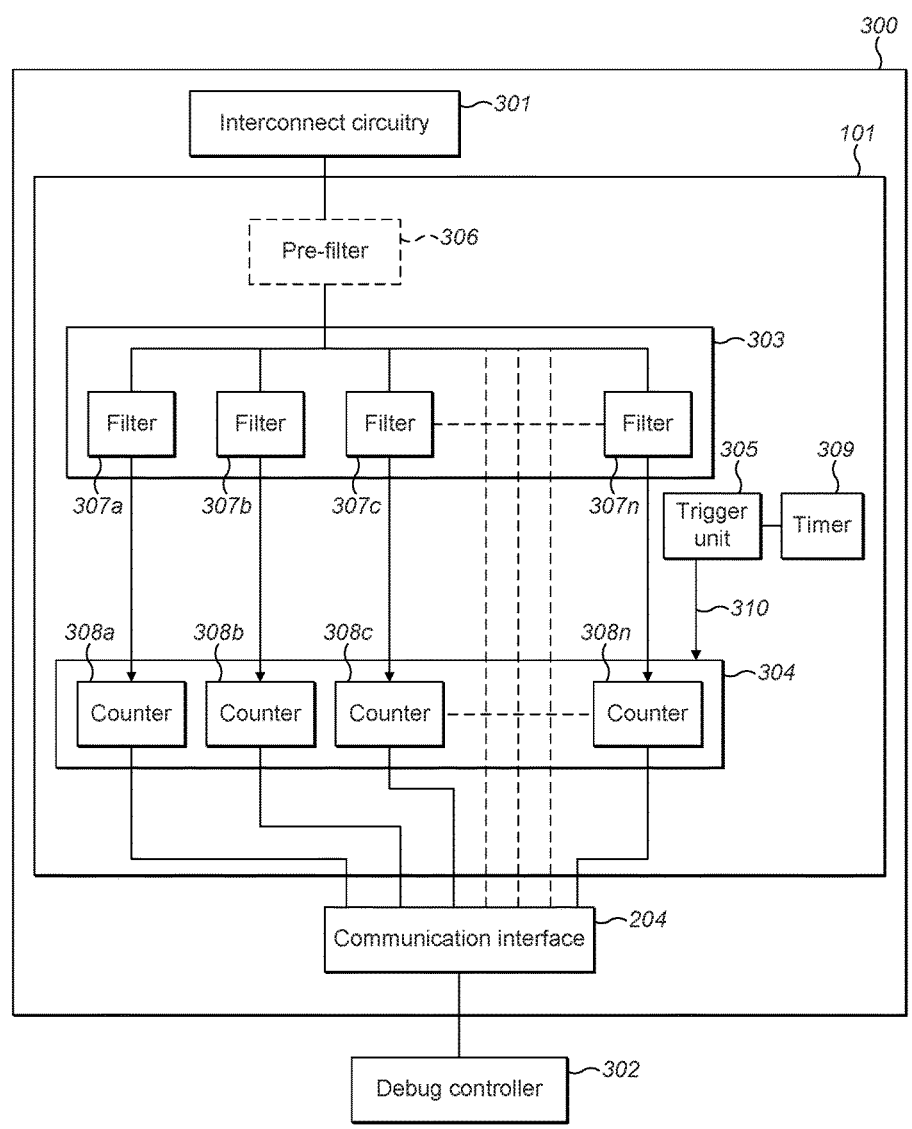
FIG. 3 is a schematic drawing of an exemplary debug architecture for profiling transactions on an integrated circuit chip device.
Figure 4:
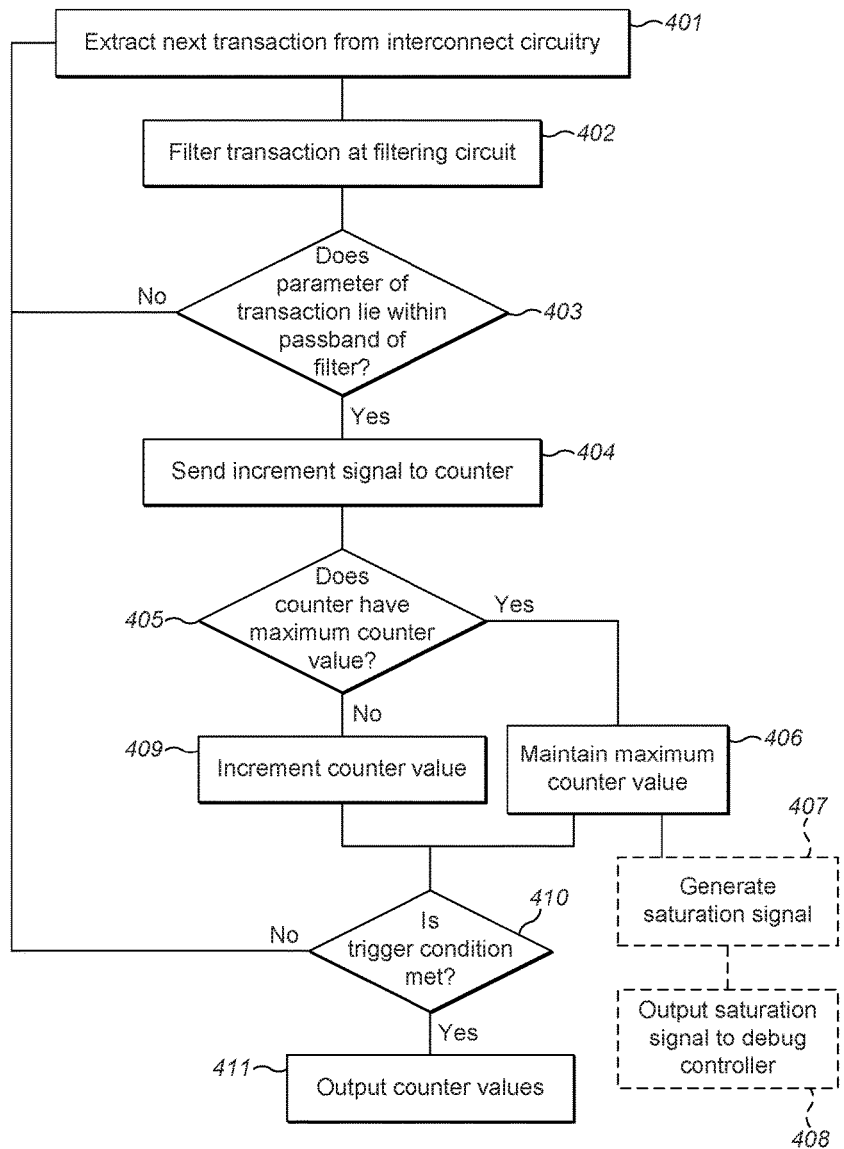
FIG. 4 illustrates a method of profiling transactions on an integrated circuit chip.

FIGS. 1 to 3 are schematic diagrams of exemplary debug architectures, and components within debug architectures. These figures present the structures in terms of functional blocks. Some functional blocks for carrying out functions well known in the art have in places been omitted from these figures. FIG. 4 is a flowchart illustrating a method of profiling transactions. The flowchart depicts an order in which the method of that flowchart can be performed. However, the flowchart is not intended to restrict the described method to being implemented in the order depicted. The steps of the method may be carried out in alternative orders to that depicted in the flowchart.

FIG. 1 illustrates the general structure of an exemplary debug architecture for a SoC 100. Debugging circuitry 101 is arranged to debug system circuitry 102. FIG. 2 illustrates exemplary system circuitry comprising core devices and a communication interface. Core devices 201, 202 and 203 of the SoC are each connected to debugging circuitry 101. Although FIG. 2 illustrates three core devices, any number of core devices can be suitably integrated into the debug architecture. Exemplary core devices include a DSP (digital signal processor), video processor, applications processor or CPU (central processor unit), graphics processor, system memory, bus, system interconnect, software, data, custom circuit and a data engine. However, any component of a SoC is suitable for being incorporated into the debug architecture as a core device on FIG. 2. The core devices may be emulators or simulators of other devices on the chip. For example, a core device may emulate a processor.

The debugging circuitry is able to manipulate the operation of the core devices and monitor the operation of the core devices. The debugging circuitry is connected to a communication interface 204. Communication interface 204 may be configured to communicate with entities off-chip. For example, debugging circuitry 101 may communicate with an off-chip debug controller via communication interface 204. Communication interface 204 may also be configured to communicate with other entities on-chip. For example, debugging circuitry 101 may communicate with an on-chip debug controller via communication interface 204. Although FIG. 2 illustrates one communication interface, any number of communication interfaces can be integrated onto the SoC. The communication interfaces implemented are chosen in dependence on the type of connections that are to be made. Exemplary communication interfaces include: traditional debug interfaces such as JTAG, parallel trace input/output, and Aurora based high-speed serial interface; and reuse of system interfaces such as USB, Ethernet, RS232, PCIe and CAN.

The following description focuses on examples in which a core device of FIG. 2 is interconnect circuitry, and the debugging circuitry 101 monitors transactions on the interconnect circuitry. The interconnect circuitry transports data between components of the SoC as transactions in accordance with the interconnect circuitry's communication protocol. The interconnect circuitry may, for example, be a system bus. The interconnect circuitry may, for example, be a memory interface. The debugging circuitry monitors the transactions by recording statistics about the parameters in the fields of the transactions. Suitably, the debugging circuitry records this information whilst the interconnect circuitry continues operating under normal conditions. The recorded statistics enable a profile of the transactions on the interconnect circuitry to be built up.

A method will now be described by which the debugging circuitry profiles transactions on the interconnect circuitry, with reference to the debugging architecture illustrated on FIG. 3 and the flowchart of FIG. 4.

At step 401, the debugging circuitry 101 extracts the next transaction from interconnect circuitry 301. At step 402, the debugging circuitry 101 filters the transaction at filtering circuit 303. The filtering circuit assesses whether the transaction comprises a parameter having a value which lies within the passband of the filtering circuit.

The filtering circuit may comprise only one filter which compares the value of the parameter in the transaction to a predetermined value or range of values. Alternatively, the filtering circuit may comprise a bank of filters 307a, 307b, 307c . . . 307n as shown in FIG. 3. For example, the debugging circuitry may monitor the transactions for several parameters. In this case, one or more filter is specialised to filter the transaction for a first parameter, and one or more other filter is specialised to filter the transaction for a second parameter, and so on. The debugging circuitry may monitor the transaction for several different values or range of values of a parameter. In this case, more than one filter may be specialised to filter the transaction for the same parameter, but the passbands of those filters are different. The debugging circuitry may monitor the transaction for several different values or range of values of several parameters. In this case, a filter may be specialised to filter for several parameters. Each filter may be specialised to filter for the same parameters, but the passbands of the different filters are different in respect of at least one of the parameters. The bank of filters may filter a transaction in parallel as shown in FIG. 3. Alternatively, the bank of filters may be structured hierarchically, for example in a cascaded filter design. In this case the filters do not all filter the transaction in parallel. Instead, one or more filter filters the transaction first. Only if the transaction falls within the passband of those filters, do filters in the next level of the hierarchy filter the transaction. As an example, the bank of filters may comprise two hierarchical filtering layers. In the first layer one filter assesses whether a parameter is present in the transaction. Only if the parameter is present, is the value of that parameter then assessed by the filters in the second layer of filters. The second layer comprises several filters, each of which has a different passband for the parameter. If the parameter is not present in the transaction, then the transaction is discarded. In this case, the second layer of filters does not interact with the transaction at all.

The filter(s) of the filtering circuit may be configured to filter the transaction by comparing the value of the parameter in the transaction to the passband of the filter for that parameter. The parameter passes the filter if the value of the parameter in the transaction matches the passband of the filter. The parameter does not pass the filter if the value of the parameter in the transaction does not match the passband of the filter. The filter may compare one, several or all bits of the transaction parameter value to the passband of the filter. The filter may first mask the parameter value of the transaction to form a masked parameter value. The masked parameter value has the same number of significant bits as the passband of the filter. Thus, those two values can be directly compared.

At step 403, the debugging circuitry determines whether the value(s) of the assessed parameter(s) of the transaction lie within the passband of the filtering circuit. If none of the transaction's parameter values lie within the passbands of the filters of the filtering circuit, then no further action is taken in respect of the transaction. The transaction is discarded, and the method returns to step 401 where the next transaction is extracted from the interconnect circuitry. If one or more of the value(s) of the assessed parameter(s) of the transaction lie within the passbands of the filters of the filtering circuit, then an increment signal is sent to one or more counters of the bank of counters 304. Suitably, each filter of the bank of filters of the filtering circuit is connected to a respective counter 308a, 308b, 308c . . . 308n of the bank of counters 304. If a parameter value lies within the passband of a filter, that filter outputs an increment signal to its respective counter. Suitably, only if the parameter value lies within the passband of a filter, is an increment signal sent to its respective counter. If the filtering circuit 303 is a complex filtering circuit comprising cascaded filters, then only the most fine-grained filters are connected to respective counters.

For the case that each filter filters a different value or range of the same parameter, the filtering circuit 303 may be implemented as a decoder circuit. The parameter value of the transaction is input to a bank of decoders. Alternatively, a value computed from one or more parameter values of the transaction is input to the bank of decoders. For example, the value may be a subset of the bits of the parameter value. Alternatively, the value may be a concatenation of subsets of the bits of two or more parameter values of the transaction. For example a 4-bit value would be input to a bank of 16 decoders. Only the decoder which matches the value of the transaction outputs an increment signal to its associated counter.

At step 405, the debugging circuitry determines whether the counter which has received the increment signal has its maximum counter value. If the counter does not currently have its maximum counter value, then the counter responds to the increment signal by incrementing its counter value by one count at step 409. If the counter does currently have its maximum counter value, then the counter responds to the increment signal by maintaining its maximum counter value 406. Thus, for those counters which are not saturated, the counter value of a counter represents the number of transactions having a parameter value lying within the passband of the connected filter since the counter values were last output and the counters reset. Once a counter is saturated, its counter value no longer necessarily directly represents the number of transactions having a parameter value lying within the passband of the connected filter since the counter values were last output and the counters reset. Allowing the counter to remain saturated is a form of lossy compression. It indicates to the debug controller that that parameter value was heavily active in transactions since the last counter output and reset, without identifying the exact number of relevant transactions. Thus, the saturated counter value is indicative of the number of transactions having a parameter value lying within the passband of the connected filter since the counter values were last output and the counters reset, but does not provide a direct measure of this number.

The bank of counters may be implemented using a single counter having multiplexed carry chains. The multiplexors segregate the single counter into a plurality of individual counters. Each multiplexor is used to either (i) propagate the carry from the previous bit in the case that the individual counter was not incremented, or (ii) inject a new carry if that individual counter was incremented. Other mechanisms of implementing the bank of counters may be used.

In an exemplary implementation, once a counter has reached its maximum counter value, a saturation signal is generated at step 407. This saturation signal may then be output to the debug controller at step 408.

At step 410, the debugging circuitry determines whether a trigger condition is met. If the trigger condition is not met, then the method returns to step 401 where the next transaction is extracted from the interconnect circuitry. If the trigger condition is met, then the debugging circuitry responds by outputting the counter values of the bank of counters at step 411. The counter values are output to the communication interface 204. Communication interface 204 formats the counter values into a debug message which it sends to the off-chip debug controller 302.

An exemplary trigger condition is a specified time interval having passed since the last counter output. For example, trigger unit 305 may be connected to timer 309. On expiration of a predetermined time interval T as measured by the timer 309, trigger unit 305 sends a control signal 310 to the counter bank 304 causing the counter bank to output the current counter value of each counter of the counter bank.

A further exemplary trigger condition is an event occurring on the integrated circuit chip. For example, a debug event occurring elsewhere on the integrated circuit chip may trigger the counters to output their current counter values.

A further trigger condition is saturation of a counter. The counter bank 304 may be configured to output the current counter value of each counter in response to a saturation signal being generated due to one of the counters reaching its maximum value. Alternatively, the counter bank 304 may be configured to output the current counter value of each counter in response to a control signal from the debug controller. The debug controller may send this control signal in response to receipt of a saturation signal from the debugging circuitry.

The debugging circuitry may be configured to output the counter values from the bank of counters at regular time intervals T, and to additionally output the counter values from the bank of counters in response to another triggering condition being met, for example a counter becoming saturated.

After a counter has output its counter value, the counter value of that counter is reset to 0 counts.

Downstream back-pressure occurs when counters are output faster than there is available bandwidth to transport the output count to the debug controller. Typically, this occurs either (i) when too much data is being output by counters or other components of the debugging circuitry for transport to the debug controller, all of which are competing for the same bandwidth, or (ii) when the debug controller doesn't collect the data as quickly as it is being sent to it. In this situation, it is known to discard data to be sent to the debug controller, and as soon as possible to send a message to the debug controller reporting that data was discarded. This is known as a "message_lost" message. It does not identify the data values which were discarded. For example, it is known to copy counter values to a message, reset the counters, and send the message to the debug controller if possible, and if not possible because of back-pressure, to discard the message. The method described herein avoids discarding data without any indication of what it is. If back-pressure is detected, then the debugging circuitry may respond by continuing to accumulate counts in its counters. Once, the debugging circuitry determines that the back-pressure has subsided, the debugging circuitry outputs the counter values to the debug controller. The debugging circuitry then returns to outputting the counters as previously described. By delaying the counter output, more counters are likely to saturate. However, this method still provides more information to the debug controller than a method involving discarding messages.

The debug controller receives the counter values from the debugging circuitry. From this, the debugging circuitry generates a profiling histogram, with each histogram bin corresponding to a counter of the bank of counters. The bin value of a bin represents the counter value of the corresponding counter. The histogram is output to a user interface of the debug controller.

In an exemplary implementation, in addition to the filtering circuit 303, the debugging circuitry also comprises a pre-filtering circuit 306. Following extraction from the interconnect circuitry, a transaction is pre-filtered at the pre-filtering circuit. The pre-filtering circuit may filter transactions based on transaction type. If the transaction has the desired transaction type, then the transaction goes on to be filtered by filtering circuit 303 at step 402. If the transaction does not have the desired transaction type, then the transaction is discarded and does not go on to be filtered at filtering circuit 303. For example, the desired transaction type may be transactions to a particular destination address. The pre-filter removes all transactions which are not for that particular destination address even if those transactions have parameter values which fall within the passbands of the filtering circuit.

Suitably, prior to initiating collection of profiling information, the debug controller 302 sends configuration signals to the debugging circuitry to reconfigure the configuration of the debugging circuitry so as to cause it to accumulate the desired profiling information.

The histogram bin resolution of the accumulated data is determined by the number of counts a counter can accumulate before it saturates. The debug controller determines the desired resolution for a profiling procedure, for example in response to user input. The debug controller then sends a configuration control signal to the debugging circuitry. The counter bank 304 may comprise N counter bits. The debugging circuitry allocates a number of counter bits to each counter in accordance with the configuration signal. For example, the counter bank 304 may comprise 256 counter bits. These may be allocated as 256 1-bit counters, 128 2-bit counters, 64 4-bit counters etc. The counters in the counter bank may have different sizes, for example there may be 64 2-bit counters and 32 4-bit counters.

The parameter values that each histogram bin represents is determined by the parameter bounds of the filtering circuit 303. The debug controller determines the desired parameter values for a profiling procedure, for example in response to user input. The debug controller then sends a configuration control signal to the debugging circuitry. The debugging circuitry sets the configuration of the filters of the filtering circuitry in accordance with the configuration signal. In the case that the filtering circuitry comprises filters which filter a transaction for different parameters, the configuration signal received from the debug controller sets the configurations of the filters differently to assess those different parameters. For example, this may be implemented by configuring the filters to assess different fields of the transaction. In the case that the different filters monitor a transaction for different values or range of values of a parameter, the configuration signal received from the debug controller sets the passbands of the filters to those different values or range of values. In the case that a filter masks a parameter value of a transaction prior to comparing it to the passband of the filter, the configuration received from the debug controller sets the mask width. In the case that the debugging circuitry comprises a pre-filter 306, the configuration of the pre-filter is received from the debug controller in a configuration signal.

The histogram bin resolution of the accumulated data also depends on the frequency with which the counter values are output to the debug controller. The debug controller determines the desired output for a profiling procedure, for example in response to user input. The debug controller then sends a configuration control signal to the debugging circuitry specifying the trigger conditions under which the debugging circuitry is to output the counter values from the counters. For example, if the debug controller expects the counter values to increment quickly for a particular profiling procedure, it may instruct the debugging circuitry to decrease the time interval between successive counter outputs. It may also instruct the debugging circuitry to perform intermediate counter outputs upon any counter becoming saturated.

The following describes an example in which the method described with respect to FIG. 4 is used in profiling data memory in order to determine where the program is making the most data accesses, or in profiling instruction memory in order to determine the parts of the program where the most instructions are executed. In this case, the interconnect circuitry 301 of FIG. 3 is a memory interface to the memory being profiled. The transaction parameter being monitored is a memory address. The user may specify a start memory address, a step size and a resolution. A coarse view of the whole memory may be specified, in which case the step size is large. For example, 256 counter bits may be allocated as 256 1-bit counters each having a step size of 16 MB, the first counter starting at 0 GB. Thus, the first counter's passband is 0-16 MB, the second counter's passband is 16-32 MB, and onwards up to the $256^{th}$ counter which has a passband of 4080-4096 MB. Alternatively, a finer view of a smaller section of memory may be specified, in which case the step size is small. For example, 256 counter bits may be allocated as 256 1-bit counters each having a step size of 1 kB, the first counter starting at 256 kB. Thus, the first counter's passband is 256-257 kB, the second counter's passband is 257-258 kB, and onwards up to the $256^{th}$ counter which has a passband of 511-512 kB. If greater resolution is specified, then 4-bit counters may be used instead. For example, for a coarse view of the memory, the 256 counter bits may be allocated as 64 4-bit counters each having a step size of 64 MB, the first counter starting at 0 GB. Thus, the first counter's passband is 0-64 MB, the second counter's passband is 64-128 MB, and onwards up to the $64^{th}$ counter which has a passband of 4032-4096 MB. For a finer view of a smaller section of memory, the 256 counter bits may be allocated as 64 4-bit counters each having a step size of 1 kB, the first counter starting at 256 kB. Thus, the first counter's passband is 256-257 kB, the second counter's passband is 257-258 kB, and onwards up to the 65th counter which has a passband of 319-320 kB. The debug controller sends control signals to the debugging circuitry to cause the debugging circuitry to reconfigure the counters in accordance with the user specified start address, step size and resolution. The debug controller also sends control signals to the debugging circuitry to cause the debugging circuitry to reconfigure the filtering circuit in accordance with the user specified start address, step size and resolution. For example, in the case that the filtering circuit is implemented as a decoder circuit, the control signals specify which subset of bits of the parameter value(s) is input to the decoder circuit.

The pre-filter 306 may be configured to identify transactions of interest by comparing the high order address bits of each transaction to its passband. The passband may correspond to all addresses in the memory being profiled, or a subset of those addresses. Only those transactions whose high order address bits fall within the passband of the pre-filter are then assessed by the filtering circuit 304. The filters of the filtering circuit may be configured to filter the transactions by comparing a selection of the address bits of each transaction to their passbands. For example, each filter may compare the low order address bits of a transaction to its passband. The number of bits to compare depends on the step size and resolution of the filter. For coarse-grained profiling, low order address bits of a transaction are compared to the passband of the filter. For fine-grained profiling, higher order address bits of a transaction are compared to the passband of the filter. The filter applies a mask to the transaction address as described above. If the transaction address falls within the passband of the filter, it sends an increment signal to its corresponding counter.

Thus, the counter counts up the number of instances that a specific memory address or range of memory addresses is accessed between each counter output and reset. The debug controller generates a histogram from the accumulated counter values which is output to a user interface. The user may then modify the operation of the memory functionality in response to the profiling. For example, the user may reconfigure the memory caches, or change the instructions selected to form a program.

The methods described herein may be used in profiling any parameter expressed in a transaction. That parameter may, for example, be an address, burst length, response, or a transaction identifier.

The methods described herein enable profiling of both data memory and instruction memory. It does this in a precise manner since every transaction is assessed by the debugging circuitry. It also does this in a non-intrusive way, since the interconnect circuitry continues to operate in its normal manner as the profiling is being carried out. The methods described herein provide deeper visibility of potential system bottlenecks that conventional profiling does not. For example, by assessing transactions on a bus, bus delays can be analysed.

Each component of the SoCs illustrated in FIGS. 1 to 3 may be implemented in dedicated hardware. Alternatively, each component of the SoC illustrated in FIGS. 1 to 3 may be implemented in software. Some components may be implemented in software, whilst other components are implemented in dedicated hardware.

Suitably, debugging circuitry 101 and communication interfaces 204 are hardware circuits forming part of SoC 100. Preferably, debugging circuitry for controlling and/or monitoring complex core devices and peripherals such as processors uses suitably complex state machines as part of their control unit. Suitably, communication interfaces use suitably complex state machines to implement their complex protocols. Various approaches to realising state machines are known. Such state machines can be realised using: (i) only logic gates; (ii) a combination of logic gates and memory, where the memory is used to contain tables of values to simplify the state machine's operation or to make it programmable; or (iii) a processor core to execute software stored in memory. Where a processor core is used it can be: (i) integral to the specific debug unit, communication interface, or other debugging circuitry; or (ii) shared between several debug units to reduce their implementation resources and cost.

The SoC described is suitably incorporated within a computing-based device. The computing-based device may be an electronic device. Suitably, the computing-based device comprises one or more processors for processing computer executable instructions to control operation of the device in order to implement the methods described herein. The computer executable instructions can be provided using any computer-readable media such as a memory. The methods described herein may be performed by software in machine readable form on a tangible storage medium. Software can be provided at the computing-based device to implement the methods described herein. For example, the debugging circuitry may comprise filtering logic to apply the filtering conditions to the transactions, counter logic to count instances of the filtering conditions being satisfied, and triggering logic to cause the counters to empty their contents in accordance with the methods described with reference to FIG. 4.

The above description describes the system circuitry and debugging circuitry as being comprised on the same SoC. In an alternative implementation, the system circuitry and debugging circuitry are comprised across two or more integrated circuit chips of an MCM. In an MCM, the integrated circuit chips are typically stacked or located adjacently on an interposer substrate. Some system circuitry may be located on one integrated circuit chip and other system circuitry located on a different integrated circuit chip of the MCM. Similarly, the debugging circuitry may be distributed across more than one integrated circuit chip of the MCM. Thus, the method and apparatus described above in the context of an SoC also apply in the context of an MCM.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of profiling transactions on an integrated circuit chip by debugging circuitry of the integrated circuit chip, the debugging circuitry including a filtering circuit and a bank of counters, the method comprising, for each transaction:
   extracting information about the transaction from interconnect circuitry of the integrated circuit chip;
   filtering, by the filtering circuit, the information about the transaction to determine which passband a parameter of the transaction lies within;
   sending an increment signal to a counter of the bank of counters, the counter having a counter value indicative of a number of transactions having the parameter lying within a passband; and
   outputting the counter values of the bank of counters in response to a saturation signal caused by at least one of the counters of the bank of counters reaching a maximum counter value.

2. A method as claimed in claim 1, further comprising, at the counter, in response to receiving the increment signal, incrementing the counter value.

3. A method as claimed in claim 1, wherein if the counter value is the maximum counter value of the counter then, at the counter, in response to receiving the increment signal, retaining the counter value as the maximum counter value.

4. A method as claimed in claim 1, further comprising, in response to a counter of the bank of counters reaching its maximum counter value, generating the saturation signal.

5. A method as claimed in claim 1, wherein the counter values are output in response to one or both of a time interval T having elapsed since the counter values were last output, or an event occurring on the integrated circuit chip.

6. A method as claimed in claim 1, comprising if the transaction does not have a parameter within a passband of the filtering circuit, discarding the transaction without incrementing a counter of the bank of counters.

7. A method as claimed in claim 1, wherein the bank of counters comprises N counter bits, the method further comprising receiving a configuration from a debug controller allocating a number of counter bits to each counter.

8. A method as claimed in claim 1, wherein the filtering circuit comprises a bank of filters, the filtering circuit receiving a configuration from a debug controller for each filter of the bank of filters.

9. A method as claimed in claim 8, comprising applying a first configuration to a first filter for monitoring a first parameter of the transaction, and applying a second configuration to a second filter for monitoring a second parameter of the transaction, wherein the second parameter is different than the first parameter.

10. A method as claimed in claim 8, comprising applying a third configuration to a third filter for monitoring a third parameter of the transaction, and applying a fourth configuration to a fourth filter for monitoring the third parameter of the transaction, wherein the fourth configuration causes the fourth filter to have a different passband for the third parameter than the third filter.

11. A method as claimed in claim 8, wherein each filter of the bank of filters is connected to a respective counter of the bank of counters, wherein only if a parameter value of a transaction lies within a passband of a filter for that parameter is an increment signal sent to the respective counter.

12. A method as claimed in claim 11, further comprising:
   masking the parameter value of the transaction to form a masked parameter value prior to filtering the transaction at the filtering circuit;
   filtering the transaction at the filtering circuit by, at each filter, comparing the masked parameter value to the passband of the filter; and
   for each filter, if the masked parameter value matches the passband of the filter, sending an increment signal to the respective counter.

13. A method as claimed in claim 1, further comprising pre-filtering the transaction at a pre-filtering circuit to determine whether the transaction has a desired transaction type, and only if the transaction has the desired transaction type, filtering the transaction at the filtering circuit.

14. A method as claimed in claim 8, wherein the parameter is an address, and the configuration for each filter specifies a starting address and a step size.

15. A method as claimed in claim 1, wherein the parameter is one of a burst length, a transaction identifier, and a response.

16. An integrated circuit chip comprising:
   system circuitry comprising interconnect circuitry configured to transport transactions; and
   debugging circuitry comprising a filtering circuit and a bank of counters, the debugging circuitry being configured to:
      extract information about a transaction from the interconnect circuitry;
      filter, by the filtering circuit, the information about the transaction to determine which passband a parameter of the transaction lies within;
      send an increment signal to a counter of the bank of counters, the counter having a counter value indicative of a number of transactions having the parameter lying within the passband; and
      output the counter values of the bank of counters in response to a saturation signal caused by at least one of the counters of the bank of counters reaching a maximum counter value.

17. An integrated circuit chip as claimed in claim 16, wherein the bank of counters comprises N counter bits, the debugging circuitry being configured to receive a configuration from a debug coral viler and allocate a number of counter bits to each counter in accordance with the configuration.

18. An integrated circuit chip as claimed in claim 16, wherein the filtering circuit comprises a bank of filters, the debugging circuitry being configured to receive a configuration from a debug controller and allocate a configuration to each filter of the bank of filters in accordance with the configuration.

19. An integrated circuit chip as claimed in 16, further comprising a pre-filtering circuit configured to pre-filter the transaction to determine whether the transaction has a desired transaction type, the integrated circuit chip being configured to only filter the transaction at the filtering circuit if the transaction has the desired transaction type.

20. An integrated circuit chip as claimed in claim 16, wherein the interconnect circuitry is a bus or a memory interface.

* * * * *